Jan. 26, 1960

K. W. HERING 2,922,351

AUTOMATIC FOCUS MECHANISM

Filed April 9, 1956

INVENTOR.
KARL W. HERING
BY
ATTORNEY and
AGENT

Jan. 26, 1960     K. W. HERING     2,922,351
AUTOMATIC FOCUS MECHANISM
Filed April 9, 1956     2 Sheets-Sheet 2
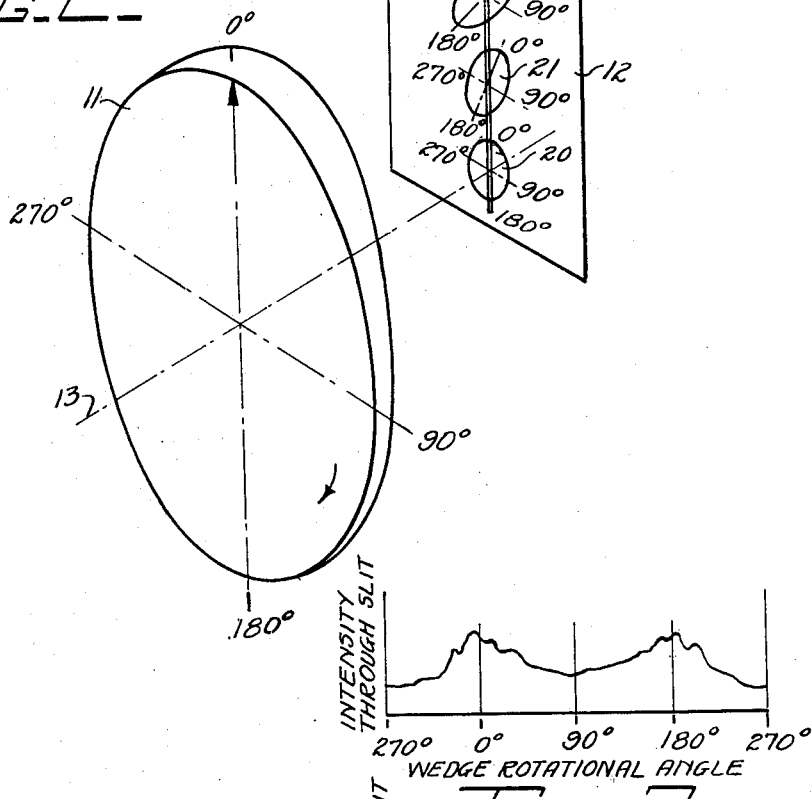
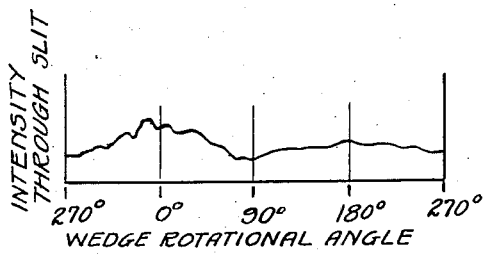
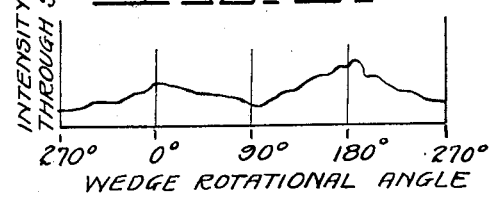
INVENTOR.
KARL W. HERING
BY
ATTORNEY
AGENT

United States Patent Office 2,922,351
Patented Jan. 26, 1960

2,922,351

AUTOMATIC FOCUS MECHANISM

Karl W. Hering, Ridgefield, Conn., assignor to the United States of America as represented by the Secretary of the Air Force Application April 9, 1956, Serial No. 577,182

4 Claims. (Cl. 95—45)

It is the object of this invention to provide means for automatically focusing an aerial camera. Although the mechanism is particularly applicable to aerial cameras, it may also be used with other cameras operating under similar optical conditions.

A further object of this invention is to provide an automatic camera focusing mechanism in which the accuracy of focus is greater than can be accomplished visually. This accuracy is due in part to the fact that the condition of focus is sensed from an image formed by the camera lens system rather than by an auxiliary lens system.

Briefly, the mechanism comprises a mirror system situated between the camera lens and the film and positioned so as to divert out of the camera light coming from a portion of the object field lying just outside the area being photographed. This light is passed through a rotating glass wedge to an opaque plate normal to the axis of rotation of the wedge, the plate containing a narrow slit intersecting the axis of rotation. The light passing this slit is converted by a photocell into an electrical signal containing, as will be explained later, information regarding the condition of focus of the image with respect to the plate. This information is used in a suitable servo system to actuate the focusing mechanism of the camera.

The invention will be explained in more detail in connection with the specific embodiment thereof shown in the accompanying drawings, in which Fig. 1 is a schematic diagram of the automatic focusing device;

Fig. 2 illustrates the method of sensing the condition of focus;

Figs. 3, 4 and 5 illustrate light intensities through the slit for various conditions of focus.

Figure 1:
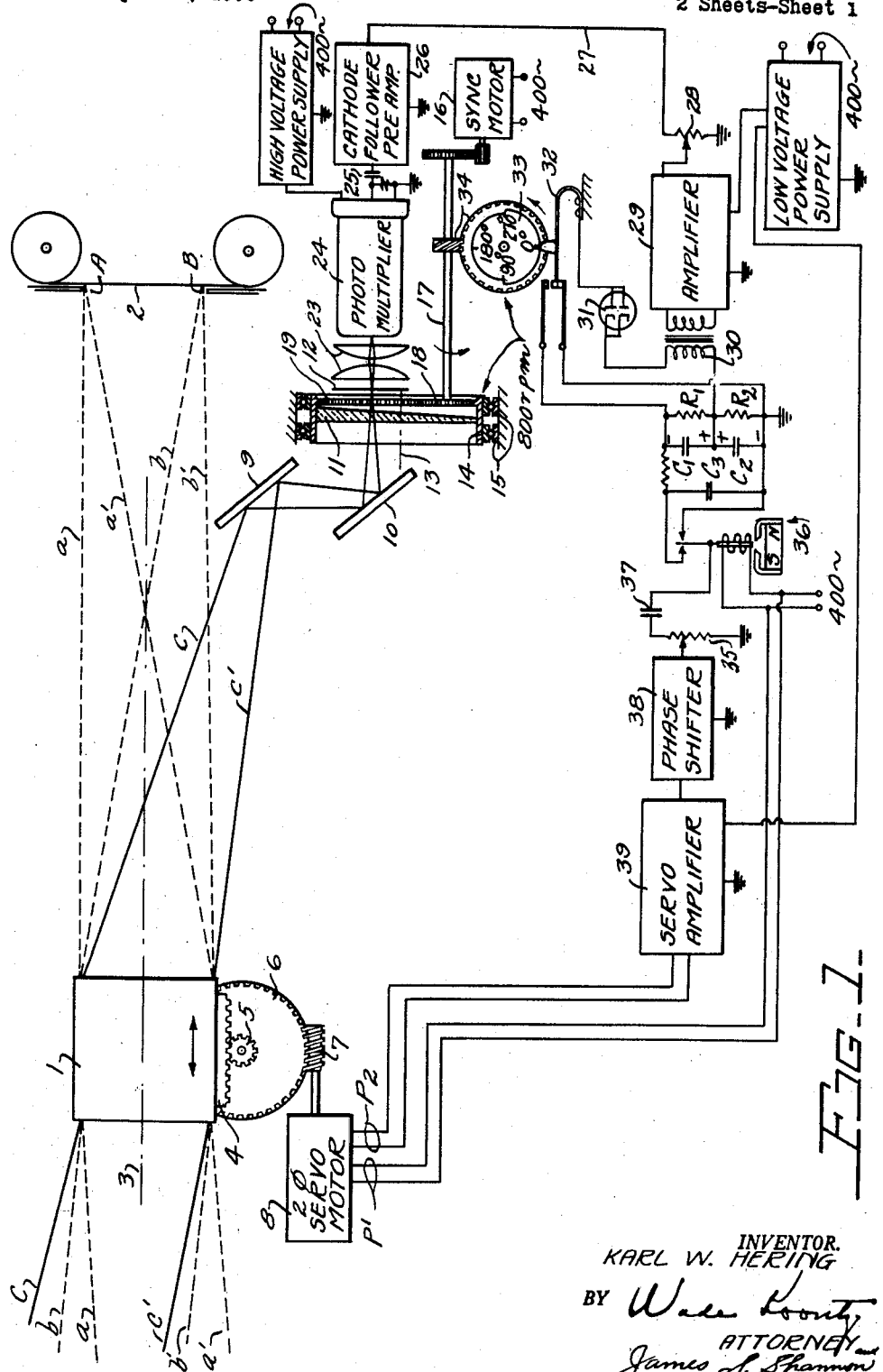

Referring to Fig. 1, numeral 1 represents the lens barrel of a camera. For the purpose of focusing an image on the photographic film 2, the lens barrel may be moved in either direction along the optical axis 3 of the lens system contained in the barrel by means of rack 4, pinion 5, gear 6 and worm 7, the latter being driven by 2-phase servomotor 8. Lines a—a' and b—b' represent the outer boundaries of two bundles of light rays emanating from two points near the lower and upper limits, respectively, of the photographic field of view of the camera, these points being imaged at A and B, respectively, on the film.

Mirror 9 is positioned as close as possible to the lower boundary b' of the volume of light rays extending between the camera lens and the film. This mirror therefore intercepts the light coming from an area located just outside the photographic field of view of the camera. With the long focus lenses normally used in aerial photography, the photographic field of view, or field of view as determined by the film area, is considerably less than the field of view over which the lens is capable of forming a good image. Lines c—c' represent the boundaries of a bundle of light rays emanating from a point in this area. These rays are redirected by mirror 10 through a rotating glass wedge 11 to an opaque plate 12. Plate 12 is normal to the axis of rotation 13 of wedge 11 and contains a narrow slit 12' (Fig. 2) of the order of .001" in width, intersecting axis 13 and of sufficient length to extend beyond the area of light on plate 12 due to mirrors 9 and 10. Wedge 11 is carried by barrel 14 journalled in ball bearings 15. The barrel and wedge are rotated at constant speed about axis 13 by synchronous motor 16 acting through shaft 17, pinion 18 and internal gear 19. A suitable speed of rotation is 800 r.p.m.

The operation of rotating wedge 11 and slit 12' in sensing the condition of focus of the camera may best be understood by reference to Figs. 2–5. Fig. 2 illustrates the conditions of focus at plate 12 when the camera image is in perfect focus on the film. Curves 20, 21 and 22 represent the loci of the images of three points in the field of view of the focus mechanism as wedge 11 rotates thorugh 360°. For image points lying near the intersection of axis 13 and slit 12', the loci are circles on plate 12 as shown by curve 20. As the distance from axis 13 increases, the loci become ellipses having their minor axes on plate 12 and their major axes inclined thereto as shown by curves 21 and 22. The inclination of the major axes increases as the distance from the rotational axes 13 increases.

Considering that part of the image in the vicinity of locus 20, as wedge 11 rotates the image moves in such a manner that the image detail is scanned across the slit twice, once for the scanning portion 270°–0°–90° and once for the portion 90°–180°–270°. Motion across the slit allows the light passing through the slit to follow the intensity distribution of the image, whereas motion parallel to the slit produces no intensity fluctuation. Therefore the greater intensity variations are centered about the 0° and 180° positions of the wedge. This is illustrated in Fig. 3 which represents the light intensity passing slit 12' for that part of the image in the vicinity of locus 20. For those portions of the image removed from the axis 13, as represented by loci 21 and 22, Fig. 3 is also applicable, the only difference being that the intensity variations in the vicinity of the 0° and 180° positions of the wedge are not as great due to out-of-focus condition of the image at the slit in these positions. However, the reduction in intensity is the same in each position since the focal plane is as far behind the slit in the 0° position as it is in front of the slit in the 180° position. Fig. 3, therefore, is in general representative of the variation in intensity of the total light passed by slit 12' when the camera is in focus. It will be noted that the 270°–0°–90° portion of Fig. 3 is a mirror image of the 90°–180°–270° portion.

In effect, therefore, for any off-axis area of the image, the focal plane oscillates about the position it has in the 90° and 270° positions of the wedge, the movement being in the direction of axis 13 and extending equal distances in front and behind the 90°–270° position. During a complete oscillation the light rays forming the image are scanned across the slit twice, once while the focal plane is in front of the 90°–270° position and once while the focal plane is behind this position.

Where the camera is not in focus the conditions in Fig. 2 no longer exist and the intensity distribution of the light passing the slit varies from the symmetrical distribution obtained in the properly focused condition shown in Fig. 3. If the position of the camera lens is such that the image falls in front of the film then the loci 20, 21 and 22 are nearer the wedge than in Fig. 2. In this condition the intensity distribution of the light passing through the slit in the vicinity of locus 20 retains the symmetry of Fig. 3 but the intensity fluctuations are less pronounced and the peak intensities are reduced due to the out-of-focus condition of the image at the slit in all positions of the wedge. In the case of that part of the image removed from axis 13, as represented by loci 21 and 22, the image is more nearly in focus at the slit in the 0° position of the wedge than in the 180° position. Consequently, higher intensity peaks and greater intensity fluctuations occur in the 270°–0°–90° half of the scan than during the 90°–180°–270° half, as illustrated in Fig. 4. Similarly, if the position of the camera lens is such that the camera image falls behind the film, loci 20, 21 and 22 are moved to positions farther from wedge 11 than their positions in Fig. 2 with the result that the greater intensities and intensity fluctuations occur in the 90°–180°–270° half of the scan as illustrated in Fig. 5. Figs. 4 and 5, therefore, are representative of the intensity distributions encountered in the two out-of-focus conditions of the camera. It is evident that the difference in the peak intensities obtained in the two halves of the scanning cycle is directly related to the focusing error and that the phase of the light maximum relative to the scanning cycle is indicative of the direction of the error.

Suitable design parameters for the above are a wedge angle of 1½°, a wedge speed of 800 r.p.m. or about 13 rotational cycles/sec. and a position of the wedge relative to the image such that the image detail near the axis of rotation of the wedge rotates in circles of about 0.010″ radius.

Referring again to Fig. 1, the apparatus for sensing the above intensity difference and peak intensity phase and for adjusting the camera lens position accordingly will be described.

The light passed by the slit in plate 12 is gathered by condensing lens 23 and directed into photomultiplier 24. The photomultiplier is a tube having a photocathode, against which the light is directed, and an electron multiplier for amplifying the electron current emitted by the cathode. The output of the photomultiplier therefore is a voltage that varies in accordance with the light passed by the slit. Photomultipliers are commercially available items, the RCA 6217 for example, and need no further explanation. The output of the photomultiplier is applied through direct current blocking condenser 25 to cathode follower preamplifier 26 the principal function of which is to couple the photomultiplier to low impedance cable 27. The output of the preamplifier is applied through cable 27 and level control 28 to amplifier 29. Amplifier 29 supplies at secondary winding 30 sufficient voltage and power to charge condensers $C_1$ and $C_2$. The voltage variation at the secondary 30 corresponds to one of the curves in Figs. 3, 4 and 5 depending upon the condition of focus of the camera.

The alternating voltage at secondary 30 is rectified by unidirectional device 31 and the resulting direct voltage applied to $C_1$ or $C_2$ depending upon the position of switch 32. This switch is actuated by cam 33 which is driven from shaft 17 by right-angle gears 34 at the same speed as wedge 11. The arrangement is such that rectifier 31 is connected to $C_1$ during the 90°–180°–270° portion of the wedge rotational cycle (Fig. 2) and to $C_2$ during the 270°–0°–90° portion. The charging time constant of $C_1$ and $C_2$, as determined by the output impedance of amplifier 29 and the size of $C_1$ and $C_2$, and the discharge time constant as determined by $R_1$ and $R_2$, are made such that each condenser charges to and closely follows the maximum voltage at winding 30 during the times it is connected to the rectifier. The difference in the voltages across $C_1$ and $C_2$ appears across $C_3$.

If the camera is properly focused, the voltage at winding 30 varies in the manner of Fig. 3 and, since the peaks in the two wedge half-cycles are equal, the voltages across $C_1$ and $C_2$ cancel and the difference voltage across $C_3$ is therefore zero. If the conditions in Fig. 4 prevail, $C_2$ has a greater voltage than $C_1$ and the difference voltage is positive. For the conditions represented by Fig. 5, $C_1$ has a greater voltage than $C_2$ and the difference voltage is negative. The magnitude of the direct voltage across $C_3$ therefore is indicative of the degree of focusing error and the polarity is indicative of the direction of the error.

Servomotor 8 is controlled in accordance with the voltage across $C_3$ as follows: The direct voltage across $C_3$ is converted to an alternating voltage across level control 35 by chopper 36 and condenser 37. The chopper is operated from the same alternating current power source that supplies one phase ($P_1$) of servomotor 8. The alternating voltage produced by the chopper therefore has the same frequency as that of the alternating current power source, in this case 400 c./s. This voltage is applied through phase shifter 38 to the input of servoamplifier 39, the output of which supplies the other phase ($P_2$) of the servomotor 8. Sufficient delay is introduced by phase shifter 38 that, when added to the delays introduced by the chopper and servoamplifier, the required 90° difference in the two phases of the servomotor is obtained. The phase shifting network could and in a practical application probably would be incorporated in the coupling elements of the servoamplifier.

With zero voltage across $C_3$, $P_2$ is deenergized and the servomotor is stationary. When an error in focus occurs a direct voltage appears across $C_3$, the polarity of which indicates the direction of the error, as already explained. The presence of the error voltage causes $P_2$ to be energized by servoamplifier 39 and motor 8 operates to move lens barrel 1 until the error voltage is reduced to zero through the resulting correction of focus. The direction of rotation of motor 8, and therefore the direction of motion of the lens barrel, is determined by the polarity of the error voltage across $C_3$. This results from the fact that the phase of the alternating voltage at level control 35 reverses when the polarity of the direct voltage across $C_3$ reverses. Therefore a reversal of polarity across $C_3$ results in a reversal of phase of $P_2$ and a change from 90° leading to 90° lagging, or vice versa, of this phase relative to $P_1$. The direction of rotation of the motor is determined by whether $P_2$ lags or leads $P_1$.

I claim:

1. An automtaic focusing mechanism for a camera comprising a refractive wedge; means for rotating said wedge about an axis passing through its inclined surfaces; an opaque plate normal to said axis of rotation and positioned opposite one side of said wedge; means forming an image of a portion of the field of view of the camera lens on the same side of said wedge as said plate with the rays forming said image passing through an off-axis portion of said wedge and striking said plate; a narrow slit in an area of said plate struck by said rays, the axis of said slit intersecting the extended axis of rotation of said wedge; means synchronized with the rotation of said wedge for receiving the light passing through said slit and comparing the maximum intensity of the light passed during passage opposite the slit of the thick half of said wedge with the maximum intensity of the light passed during passage opposite the slit of the other half of said wedge, said plate being positioned so that the two maxima are equal when said camera is in focus; and means responsive to an unequal condition of said maxima to change the focus of said camera in the proper direction to restore said equality.

2. Apparatus for automatically focusing a camera comprising: a refractive wedge; means for rotating said wedge about an axis passing through its inclined surfaces; an opaque plate normal to said axis of rotation and positioned opposite one side of said wedge; means forming an image of a portion of the field of view of the camera lens on the same side of said wedge as said plate with the rays forming said image passing through an off-axis portion of said wedge and striking said plate; a narrow slit in an area of said plate struck by said rays, the axis of said slit intersecting the extended axis of rotation of said wedge; means receiving the light passed by said slit and converting it into a proportionate direct voltage; a pair of condensers; means synchronized with the rotation of said wedge for applying said direct voltage to one of said condensers during passage opposite the slit of the thick half of said wedge and to the other of said condensers during passage opposite the slit of the other half of said wedge, said plate being positioned so that the direct voltages applied to said condensers are equal when the camera is in focus; and means responsive to an unequal condition of the voltages across said condensers to change the focus of said camera in the proper direction to restore said equality.

3. Apparatus for automatically adjusting the lens-to-film distance of a camera for establishing and maintaining coincidence between the focal plane of the lens and the film plane, said apparatus comprising: a refractive wedge; means for rotating said wedge about an axis passing through its inclined surfaces; an opaque plate normal to said axis of rotation and positioned opposite one side of said wedge; means intercepting a portion of the light rays passed by said lens and directing same through an off-axis portion of said wedge and onto said plate, said light rays forming an image of a small portion of the field of view of said lens lying just outside the photographic field of view of said camera; a narrow slit in an area of said plate struck by said rays, the axis of said slit intersecting the extended axis of rotation of said wedge; means receiving the light passed by said slit and converting it into a proportionate direct voltage; a pair of condensers; means synchronized with the rotation of said wedge for applying said direct voltage to one of said condensers during passage opposite the slit of the thick half of said wedge and to the other of said condensers during passage opposite the slit of the other half of said wedge, the time constants of the charging circuits of said condensers being sufficiently short and the time constants of the discharging circuits being sufficiently long for the voltage across each condenser to follow the maximum of the applied voltage; said plate being positioned so that the direct voltages applied to said condensers are equal when the camera is in focus; and means responsive to an unequal condition of the voltages across said condensers to adjust the lens-to-film distance of said camera in the proper direction to restore said equality.

4. Apparatus as claimed in claim 3 in which said last named means comprises means for deriving a voltage equal to the difference between said condenser voltages; a source of alternating current power; means driven from said source for converting said difference voltage into an alternating voltage of the same frequency as said source; a two-phase servomotor coupled to the lens of said camera for adjusting the lens-to-film distance; means amplifying the alternating voltage produced by said converting means and applying same to energize one phase of said servomotor; means for energizing the other phase of said motor from said power source; and means for establishing a quadrature phase relationship between said two phase energizations.

References Cited in the file of this patent

UNITED STATES PATENTS

| | | |
|---|---|---|
| 2,524,807 | Kallmann | Oct. 10, 1950 |
| 2,699,834 | O'Brien | Jan. 18, 1955 |

FOREIGN PATENTS

| | | |
|---|---|---|
| 394,285 | Great Britain | June 22, 1923 |
| 735,747 | Great Britain | Aug. 24, 1955 |